US006748430B1

(12) United States Patent
Johnson

(10) Patent No.: US 6,748,430 B1
(45) Date of Patent: Jun. 8, 2004

(54) SYSTEM, METHOD AND ARTICLE OF MANUFACTURE FOR OBSERVING AND EVALUATING CURRENT AND PAST COMPUTER PLATFORM PERFORMANCE INFORMATION

(76) Inventor: R. Brent Johnson, 111 W. 5th St. Suite 300, Tulsa, OK (US) 74103

( * ) Notice: Subject to any disclaimer, the term of this patent is extended or adjusted under 35 U.S.C. 154(b) by 0 days.

(21) Appl. No.: 09/491,403

(22) Filed: Jan. 25, 2000

Related U.S. Application Data

(63) Continuation-in-part of application No. 08/942,993, filed on Oct. 2, 1997.
(60) Provisional application No. 60/057,338, filed on Sep. 2, 1997.

(51) Int. Cl.[7] .............................................. G06F 15/173
(52) U.S. Cl. ....................................... 709/224; 709/223
(58) Field of Search ................................. 709/223, 224, 709/203, 217–219, 213

(56) References Cited

U.S. PATENT DOCUMENTS

| | | | | |
|---|---|---|---|---|
| 4,463,418 | A | | 7/1984 | O'Quin, II et al. ......... 364/200 |
| 4,772,206 | A | | 9/1988 | Kerr et al. .................. 434/118 |
| 4,903,218 | A | | 2/1990 | Longo et al. ............... 364/521 |
| 4,920,481 | A | | 4/1990 | Binkley et al. ............. 364/200 |
| 4,965,772 | A | * | 10/1990 | Daniel et al. ............... 709/224 |
| 5,179,695 | A | * | 1/1993 | Derr et al. .................... 714/41 |
| 5,261,820 | A | | 11/1993 | Slye et al. .................... 434/43 |
| 5,381,470 | A | * | 1/1995 | Cambray et al. ........... 379/216 |
| 5,440,699 | A | | 8/1995 | Farrand et al. ............. 395/768 |
| 5,682,538 | A | | 10/1997 | Lemire et al. .............. 395/768 |
| 5,732,212 | A | | 3/1998 | Perholtz et al. ............. 395/200 |
| 5,742,762 | A | * | 4/1998 | Scholl et al. ............... 709/224 |
| 5,758,341 | A | | 5/1998 | Voss ............................. 707/10 |
| 5,812,864 | A | | 9/1998 | McCoy et al. .............. 395/800 |
| 5,819,071 | A | | 10/1998 | Mazer ......................... 395/500 |
| 6,023,507 | A | * | 2/2000 | Wookey ...................... 709/224 |

FOREIGN PATENT DOCUMENTS

| | | | |
|---|---|---|---|
| JP | 58084353 | 5/1983 | ............ G06F/11/34 |
| JP | 07084901 | 3/1995 | ............ G06F/13/00 |

OTHER PUBLICATIONS

"Personal Computer—Series/1 Console Emulator", IBM Technical Disclosure Bulletin, vol. 30, No. 11, Apr. 1988, pp. 361–362.

* cited by examiner

*Primary Examiner*—Hosain Alam
*Assistant Examiner*—Philip B. Tran
(74) *Attorney, Agent, or Firm*—Head, Johnson & Kachigian

(57) ABSTRACT

An improved system, method and article of manufacture for observing and evaluating current and past computer platform performance information. A monitored system's information is received by a master monitoring system central processing unit in communication with the monitored system. Monitored system performance information, typically but not limited to the form of a screen image intended for display upon a monitored system output device, is replicated using a computer program resident and executing from within the master monitoring system central processing unit. All updates to the system performance information issued by and transmitted from the monitored system central processing unit are trapped and stored within the master monitoring system central processing unit using the aforestated resident and executing program. Multiple remote users can access the stored system performance information (a.k.a screen images) simultaneously without interference with one another and browse individual and discrete sections of the individual screen history and current performance activities of a monitored system. When browsing the remote user or users is presented with a searchable history of screen images in reversed order with the most recent history transmitted to the remote user or users first. Such individual and distinct viewing of historical and current information is presented to one or more remote users in a forward and backward browseable context.

8 Claims, 15 Drawing Sheets

US 6,748,430 B1

SYSTEM, METHOD AND ARTICLE OF MANUFACTURE FOR OBSERVING AND EVALUATING CURRENT AND PAST COMPUTER PLATFORM PERFORMANCE INFORMATION

CROSS REFERENCE TO RELATED APPLICATION

This application is a continuation-in-part application of U.S. patent application Ser. No. 08/942,993 entitled EMULATION AND EMULATED SCREEN HISTORY, filed Oct. 2, 1997, which is based on Provisional Application No. 60/057,338 entitled EMULATION AND EMULATED SCREEN HISTORY, filed Sept. 2, 1997.

BACKGROUND OF THE INVENTION

1. Field of the Invention

The present invention is directed toward computer performance observation and diagnostic tools. In particular, the present invention is directed to a system, method and article of manufacture to transmit, receive, store, modify, observe and evaluate system information and updates to such information, transmitted from a monitored first system to a master monitoring second system which, in turn, may be remotely accessed by one or more monitoring subsystems.

2. Prior Art

In many industries and businesses, large numbers of transactions are processed by computer on an around-the-clock basis. As an example, certain airline reservation facilities may process 1,000 transactions per second. Because of this demand, multiple central processing units, often but not necessarily, main frame central processing units are utilized with a computer complex. Typically, each such frame computer will be connected to at least one console, including a keyboard and display terminal for operations personnel to monitor and control the operation of the system.

Operations staff personnel interface with the computer via a computer console often referred to as the system's console. This console is used to display status messages about the computer system and allows the operations staff to monitor and control the operations of the computer. For example, a batch job running on the computer might require data from a tape. The job would then issue a message to the operator via the console requesting that the required tape be mounted. The operator would then mount the required tape and inform the computer system, and the job, that it is available by making an entry at the console. Other types of messages displayed may related to errors or critical situations occurring within the computer system. The operations staff must be aware of each message displayed by the console, the intent of each such message and the appropriate response required.

Adding to the complex work load of operations staff has been the advent of multiple operating systems. Originally, an operations staff would be required to watch over one or two computers that performed principally similar functions. In today's environment, operations staff are often responsible for monitoring the operational efficiency of multiple and diverse computer complexes executing multiple computer operating systems and multiple application programs operating under the dispatching control of such computer operating systems. As used herein such complexes, operating systems, attendant hardware components and application programs, including without limitation realtime and batch applications, are referred to synonymously as "computer platforms, or platforms". In extremely large data processing complexes, such as those run by airlines, multiple and various application programs and operating systems are executed concurrently. For example, an airline will require computers to handle flight planning, load balancing, and reservations, as well as having development and test systems. It is the responsibility of the operations staff to insure that all of these systems run efficiently and without performance degradation or system outages. Consequently, the operations staff must be aware of what messages may be issued from which archives within a given complex of machines and how to react to them in the most effective and efficient manner.

Computers in large scale computer complexes typically utilize a main operations console, that is responsible for monitoring and running the system. Operations personnel who use these consoles are responsible for insuring that other users of the computer will have access to the computer's resources and functions. It is from these consoles that each computer in a complex has its performance monitored and controlled. As indicated, in many cases there are multiple computers running in a complex executing multiple and diverse operating systems. For instance, there might be several computers dedicated to testing and developing new software, other computers dedicated to maintaining accounting and inventory systems, and yet others that are connected to outside users for information access. Each of these operations and task environments could require multiple computers with each task environment requiring a different operating system. Each of these distinct computers provides for at least one, and likely multiple system consoles, and interfaces with its console in a manner unique to its operating system.

There have been many attempts to simplify the complexity of the above noted situation. mostly through software on the monitored system computers themselves. Such efforts have not met with great success because of disparate operating systems functionality. Interconnectivity between console systems from within different operating systems is a difficult task involving software to communicate between each system and yet additional software to interpret messages from the other operating systems. These systems become very cumbersome and difficult to maintain as if one operating system is modified it would likely require major modification to other interfacing operating systems. Modifying an operating system is a task that most computer avoid as modifications error may cause adverse executional effects and proliferate throughout the computer system.

Another direction of console software is for operations automation. Many operating systems have been made "smarter" to handle conditions from within the system that were formerly addressed by operation staff. These software modifications, however, cannot keep "watch" over entire complexes of computers due to lack of multiple systems connectivity. They also lack the ability to "understand" different operating systems.

The aforestated clearly speaks to ever growing complexity of the operational environment. Such increased complexity combined with an emphasis for system reliability and availability, demands advanced methods for computer performance monitoring, awareness and operational control. Computer users are requiring that their systems be available world-wide, 24 hours a day, and down time for major computer users is measured in the tens of thousands of dollars per minute. A cost which is rising expressly as 'online' dependency increases.

There is a need, therefore, to allow multiple monitored and operated computer consoles to be operated from a single work station.

Accordingly it is desirable to provide a system master monitoring system central processing unit which is capable of replicating present and past console information intended for display on each monitored system.

In the past, in an attempt to access mainframe based data or systems from a personal computer operating system, a group of "screen scrapers" have been employed. These allow a personal computer client system access to mainframe based data or systems. However, screen scrapers required custom client applications to be written that access mainframe system screens directly by mapping client access variables directly to screen row and column positions. The 'screen scraping approach' does not provide for the storing of screen display historical information in a memory for subsequent transmittal in reverse order.

Many times problems are presented on the mainframe or mini computer operating the system that go beyond the operator's ability or training to deal therewith. In such instances, it is necessary to involve technical support staff in resolving the issue or problem. In order to resolve the problem, it may be desirable to determine the events just prior to the time the problem arose.

This remote users support including remotely located field engineers who connect from a laptop personal computer or other remote device. It is, therefore, desirable to allow remote access and connection to the master monitoring system.

In addition to presenting monitored system screen information for the master monitoring system's operator's use, it is also desirable to make current screen and a history of captured screen updates available to both the master operator and to remote users, such as system engineers. It is desirable to view exactly what the operator entered prior to an error occurring in the monitored system. With this sequential information, it is possible to diagnose problems.

SUMMARY OF THE INVENTION

The present invention provides a system, method and article of manufacture to replicate system performance information typically but without limitation represented as screen images intended for display upon a monitored system output device. Such output devices often include video display capabilities, such as dumb terminals having a screen display and keyboard input. A standard cable extends from a main frame central processing unit (hereinafter referred to synonymously as "monitored system central processing unit" or "monitored system") and is connected to an adapter card. The adapter card is in turn connected to a master monitoring system central processing unit having both a display monitor and keyboard input. System performance information and indicators (hereinafter referred to synonymously as "monitored system screen image, or system performance information") from the monitored system central processing unit is thereby received at the master monitoring system. The system performance information and updates to such performance information are stored within a computer readable memory accessible to the master monitoring system central processing unit. Initially the system performance information transmitted from the monitored system pertain to a full screen image and the screen image is compressed and stored in a memory. Thereafter, a plurality of sequential updates to said performance indicator information are received at the master monitoring system central processing unit and each update is stored sequentially. In the present embodiment, a plurality of updates are stored following the initial receipt, compression and storage of a full screen image. After a plurality of updates are received and stored, the process again repeats itself. Thus, the system performance information as represented in a full screen image transmitted from the monitored system central processing unit is again compressed and stored in memory.

The present invention replicates system performance information intended for limited viewing on a dumb terminal.

An operator at the master system central processing unit has the option of viewing both a history of screen image presentations as well as simultaneous viewing of current monitored system screen activity.

A remote user, such as but not limited to a field engineer, connected via a communications line between the monitored system central processing unit and the master monitoring system central processing unit may connect to the master monitoring system central processing unit. One such example of such a connection would be a laptop computer utilized in conjunction with a dial-up line.

Multiple remote users can access the stored system performance information (a.k.a screen images) simultaneously without interference with one another and browse individual and discrete sections of the individual screen history and current performance activities of a monitored system. When browsing the remote user or users is presented with a searchable history of screen images in reversed order with the most recent history transmitted to the remote user or users first. Such individual and distinct viewing of historical and current information is presented to one or more remote users in a forward and backward browseable context.

DETAILED DESCRIPTION OF THE PREFERRED EMBODIMENTS

Figure 1:
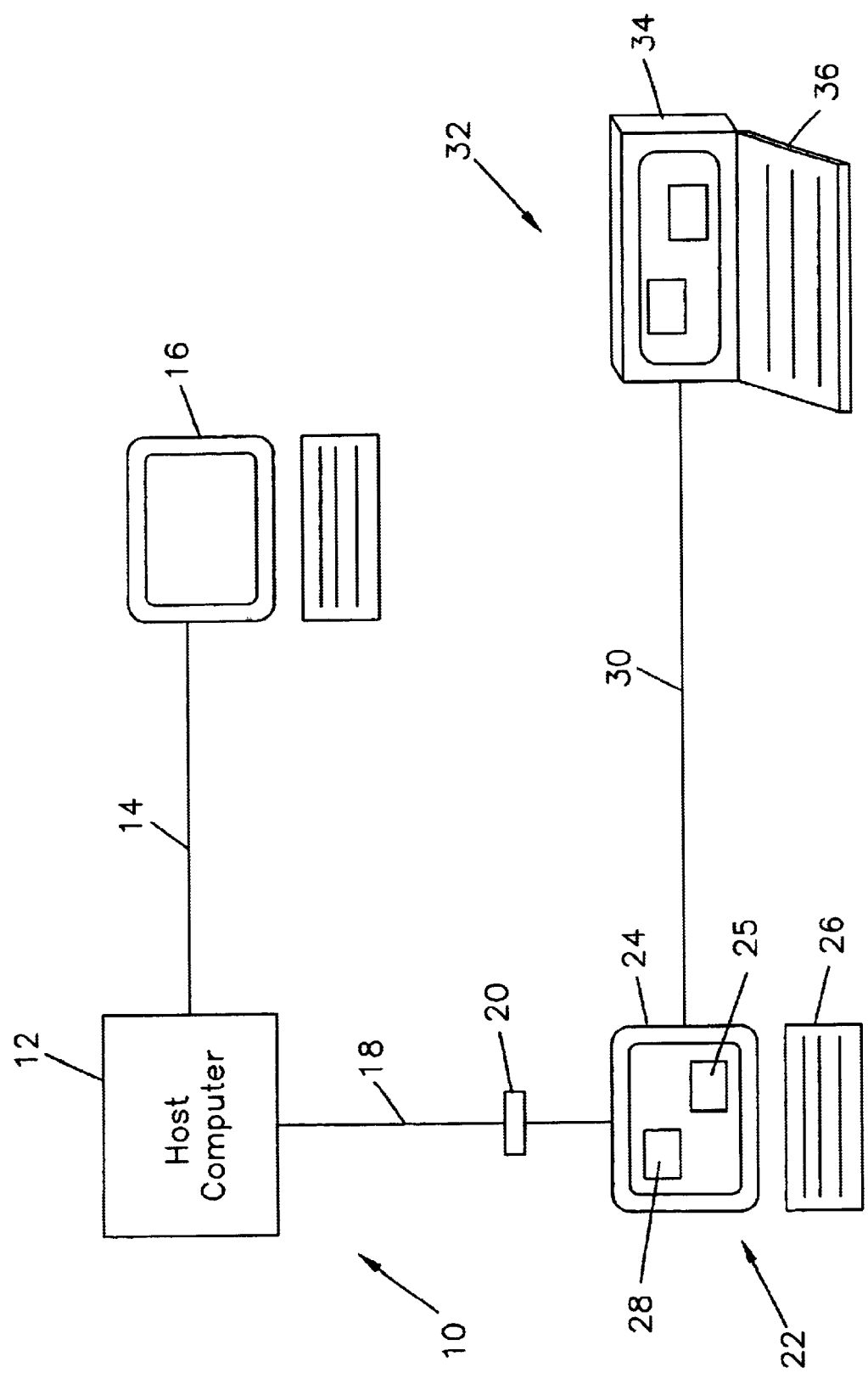
FIG. 1 is a simplified diagrammatic view of one configuration of the present invention with a system and process to replicate system performance information generated from a monitored system central processing unit configured to transmit such information.

Referring to the drawings in detail, FIG. 1 illustrates a simplified diagrammatic view of the present invention of an improved system, method and article of manufacture for observing and evaluating current and past computer platform performance information. A monitored system computer 12 may be of various configurations, such as an IBM or IBM compatible mainframe central processing unit. The mainframe computer 12 would often be connected by a 3270 coax cable 14 to a master operator, "systems" console or dumb terminal 16 having both a screen display and a keyboard input. A console hub (not shown) may be interposed between the monitored system mainframe and console terminal to connect a plurality of terminals. The mainframe monitored system thus, is in communication with the systems console 16. An operator (not shown) would work at the console 16 to monitor messages from the mainframe computer 12.

The present invention replaces the console 16 that is connected to the mainframe 16. In the present configuration, a standard 3270 coax cable is connected to an adapter card 20 which is in turn, connected to a master monitoring system personal computer (PC) central processing unit 22 having a display monitor 24 and a keyboard 26. The adapter card is a translator in order for the PC 22 to understand mainframe system 12 information. The adapter card 20 provides hardware level attachments between the monitored system controller and the master monitoring system CPU 22. System information transmitted from the monitored system 12 is thereby received at the master monitoring system central processing unit 22. Consequently, system information destined for the console 16 is instead received by the master monitoring system CPU 22. Multiple screens 28 and 29 may be replicated on the operator's CPU 22.

A similar configuration may also be used in the case of a mini computer which would be in the place of the monitored system computer 12. Such a configuration can be used with an AS/400 mini computer monitored system connecting to the master monitoring system central processing unit by a twinax cable.

The system information as it appears and updates to such information are stored in a memory at the same time such information appears on the screen. Initially, the system information delivered from the monitored system 12 pertaining to a full screen image is compressed and stored in a memory, such as a buffer. Thereafter, a plurality of updates to the system information are received at the master monitoring system central processing unit 22 and each update is stored. In this particular embodiment and depending, upon system buffer capacity, a plurality of changes or updates are stored following the initial receipt, compression and storage of a full screen image history.

After said plurality of updates or changes have been stored in memory, the process is repeated. Thus, system information pertaining to a full screen image transmitted from the monitored system is again compressed and stored. Thereafter, another series of system information updates are received and stored. All of this information results in buffered data which is stored and accessible in memory on the master monitoring system central processing unit.

In summary, all system performance information that would have appeared on the screen at the monitored system's operator console 16 has been replicated, and stored in a readably accessible memory within the master monitoring system master monitoring system central processing unit 22.

Figure 2:
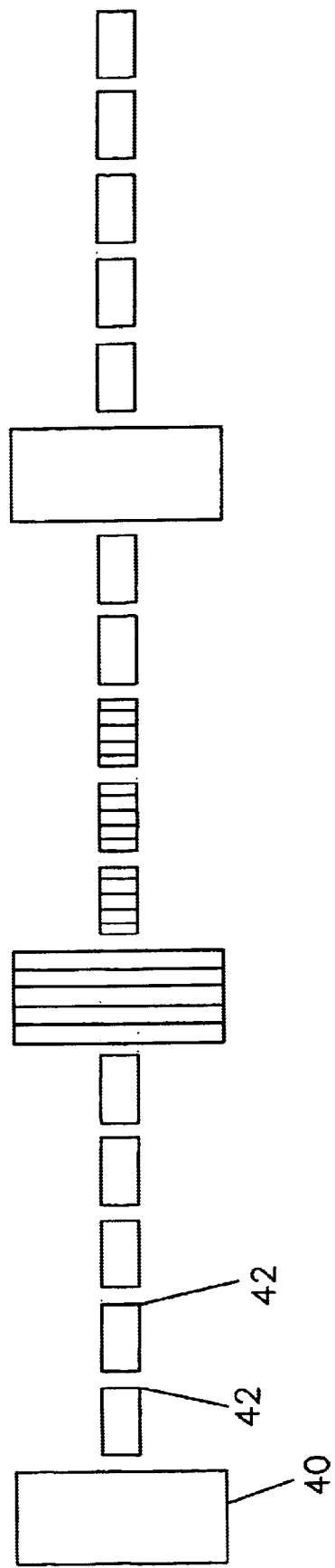
FIG. 2 is a simplified diagrammatic view illustrating the sequential process of storing system performance information.

FIG. 2 diagrammatically illustrates the sequential process of storing system performance information. Initially, information of a full screen image 40 is trapped and stored. Thereafter, a plurality of updates 42 are trapped and stored.

The present invention has the ability to emulate the replaced dumb terminal 16 for viewing several types of system performance screens. One such screen is a hardware screen for various displays of information that pertain to control and configuration of the hardware for a mainframe computer, such as starting and stopping the system, reconfiguring partitions and monitoring system usage statistics.

The second type of system performance information is a monitored system operating system screen. The prior art which normally required viewing the operator system activity of a mainframe on that mainframe, is replaced by the present invention and an emulated view is acceptable. Operating system screens are various displays that provide the user, without limitation, with the ability to enter commands to a mainframe processor, respond to error messages, initiate jobs and tasks, configure software and view information returned from the mainframe.

A third type of performance information are application screens which are displayed on a console for a mainframe. Because the application screen is effectively presented in the present invention, there is no need for a separate terminal. The application screen is fully replicated along with the hardware and operating system screens. Application screens provide interface with various software programs used for such tasks as editing software programs, running applications and data entry.

The operator at the master monitoring system CPU 22 will not only be receiving system information which is displayed on the master monitoring system CPU 22 but will also have an additional screen or window for perusing. System information that has been stored in memory is accessible as an additional screen that effectively reproduces performance information transmitted from the monitored system mainframe 12 to the master monitoring system CPU 22. Such performance history is replicated screen by screen. As the transmitted information is updated, refreshed screen information is captured and stored in memory. A history of system performance activity is thereby constructed for that particular connection, and is thus created screen by screen. A remote user, users, or the master monitoring system operator may access and browse these historical screens by scrolling backward through the history. Once at a selected point, the browsing user, users, or operator may scroll forward or backward by browsing through the system performance information so stored.

The history window may be overlaid on any existing screen display using conventional technology.

A further feature of the present invention is illustrated in FIG. 1. A remote user, such as, but not limited to, a field engineer, will often require wide access to the mainframe computer system in order to resolve problems and reduce down time. By replicating various types of system performance information, or screens, the present invention makes such information accessible to both local operators and to remote users. In FIG. 1 the operator's master monitoring system central processing unit 22 is connected via a communications link 30 to a remote central processing unit 32 which includes a display monitor 34 and a keyboard 36. One such remote central processing unit 32 would be a laptop personal computer.

Multiple users can access the replicated screen histories simultaneously, without interference with each other, and browse individually distinct segments of history and/or current monitored system screen information. It is not necessary for the entire history to be downloaded to the remote user. The remote user is provided with a searchable monitored system history in reverse order, with the most recent history information transmitted first. As screen histories are transmitted to the remote user with the most current information first, the remote user is not forced to scroll through screens of information that are not relevant.

As an example, a remote field engineer using a remote monitoring system central processing unit 32 may connect via a communications link, such as but not limited to, a line 30 to the master monitoring system master monitoring system central processing unit 22. In the present embodiment, this would be accomplished through telephone line and modem connection using standard TCP/IP protocol. The remote user might also be connected to the operator through a local area network (LAN) connection via TCP/IP protocol. The remote user, or field engineer, would be contacting the operator concerning a problem that has developed. The present system is valuable in allowing the field engineer to ascertain and solve problems.

The remote user, while simultaneously observing the monitored system's screen history, which includes operator input commands or entries, can evaluate and diagnose a problem while simultaneously conversing with the operator by telephone (not shown) who may also be viewing the monitored system's performance history. The field engineer may, thus, work with both monitored system and master monitoring system operators step by step through possible corrective measures.

FIGS. 3 through 8 are flow charts illustrating the sequential process of the invention from either the master monitoring system operator or remote user central processing unit vantage point.

Figure 3:
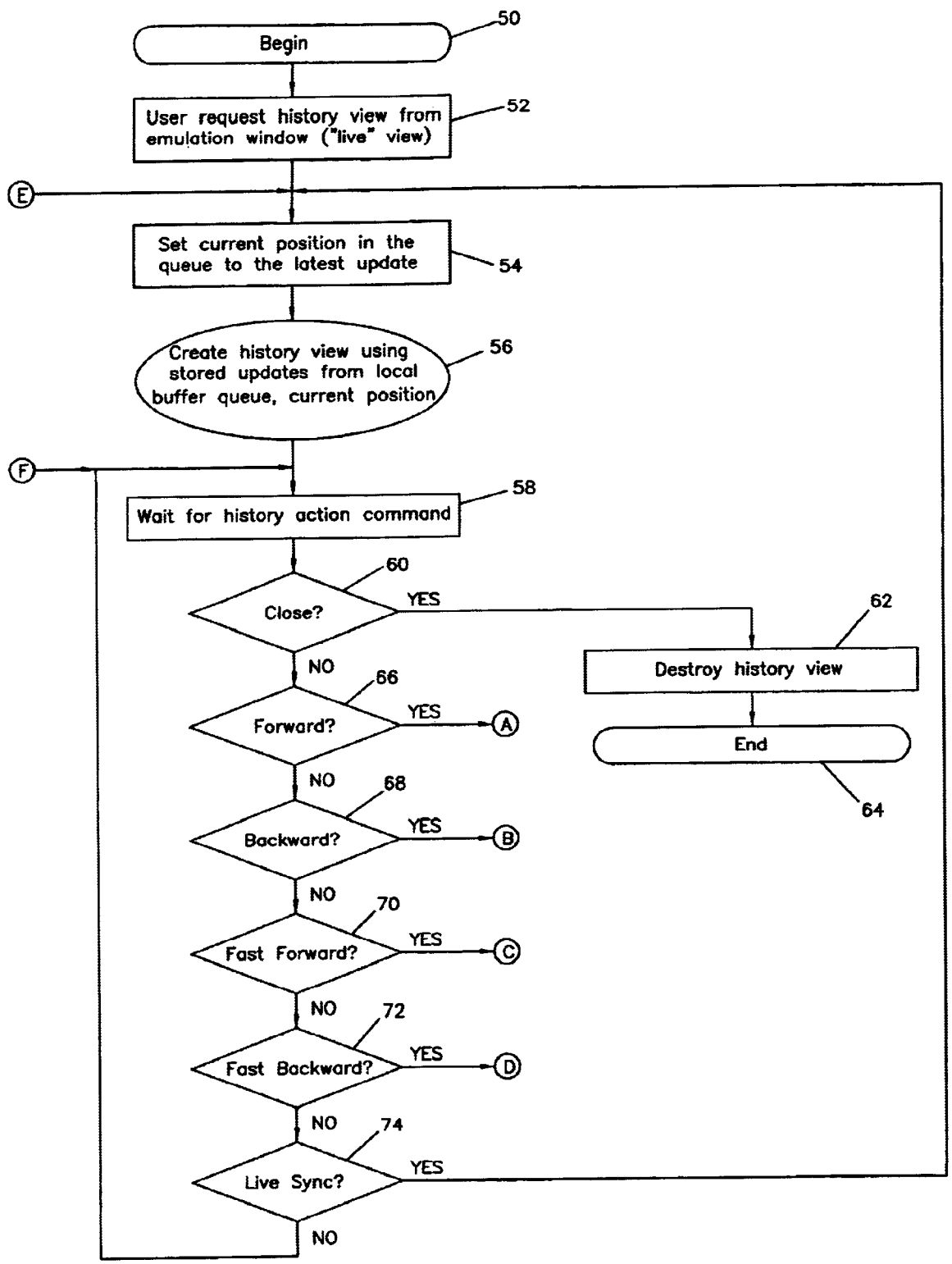
FIGS. 3 through 8 are flow char s illustrating an improved system, method and article of manufacture for observing and evaluating current and past computer platform performance information in accordance with the present invention.

As seen in the over view process in FIG. 3, once the operation has started, as seen at 50, the user will request a history view from the replication window, as shown as box 52. Thus, the history pointer into the queue is initiated.

The head pointer is set to a current position in the queue to the latest update, as shown at box As seen in oval 56, a history view is created using stored updates from the memory or local buffer queue. This process will be explained in detail.

As seen at box 58, the process will wait for a further command. If the system is to be closed, as at diamond 60, the history window will disappear, as at box 62, and the sequence will be terminated, as at 64.

If not closed, there are five possible actions: forward 66; backward 68; fast forward 70; fast backward 72; or live sync 74. In each case, if none of these command is forthcoming, the system will recirculate as shown at F to wait for a history action command 58.

FIGS. 4, 5, 6 and 7 illustrate in detail the process when each of these actions is initiated.

Figure 4:
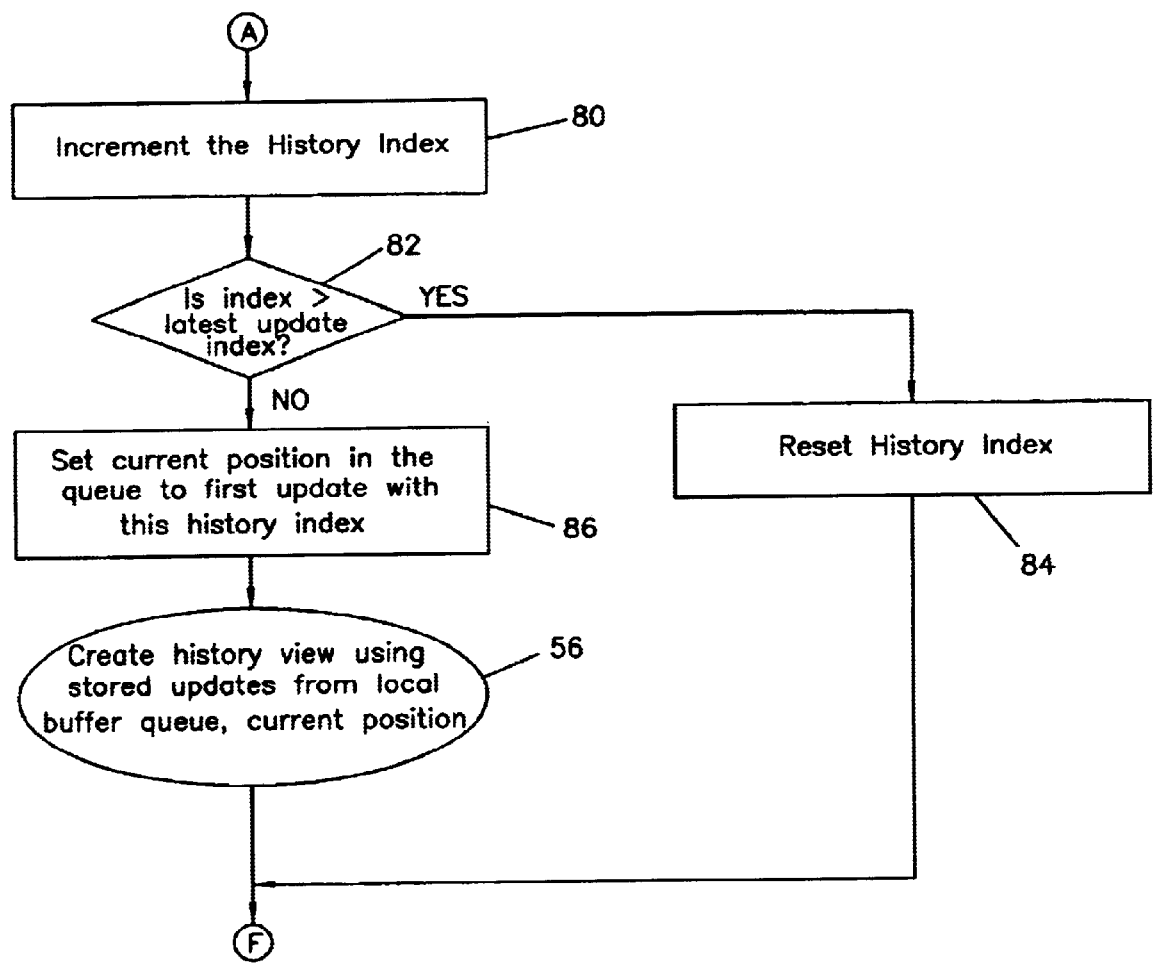

FIG. 4 illustrates the forward action in detail. In FIG. 4, once the forward command is initiated, the history pointer is moved forward as at box 80. If the index is greater than the latest update index, as shown at diamond 82, the history index is reset as at 84, so that the system will recirculate to wait for a further history action command.

If not, the current position in the queue is set to the next sequential update as shown in box 86. Thereafter, a history view is created 56.

Figure 5:
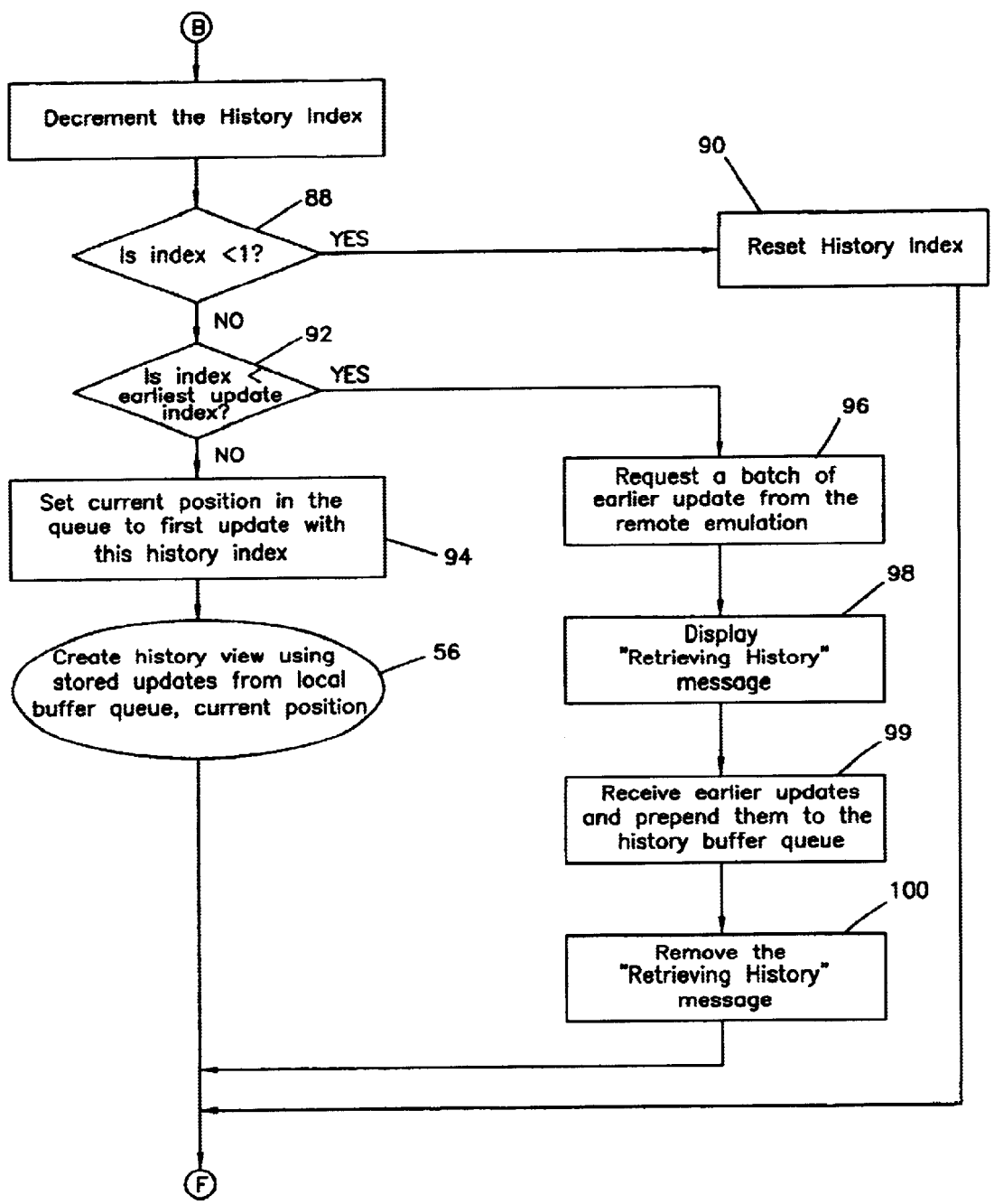

In FIG. 5, the process shows in detail the sequence when the backward command is initiated. A similar process is employed. If the index is less than one, as shown at box 88, the history index is reset, as shown at 90. The system then recirculates, as described in FIG. 3.

If not, it is determined if the index is less than the earliest update index, as shown at 92. If not, the next sequential update is set in the queue and the history view is created, as at 56. If the index is less than the earliest update index, a batch of earlier updates is requested from the remote replication, as shown at box 96. A display message "Retrieving History" is displayed, at that 96. Earlier updates are added to the beginning of the queue, as at 99. Finally, the "Retrieving History" message is removed.

Figure 6:
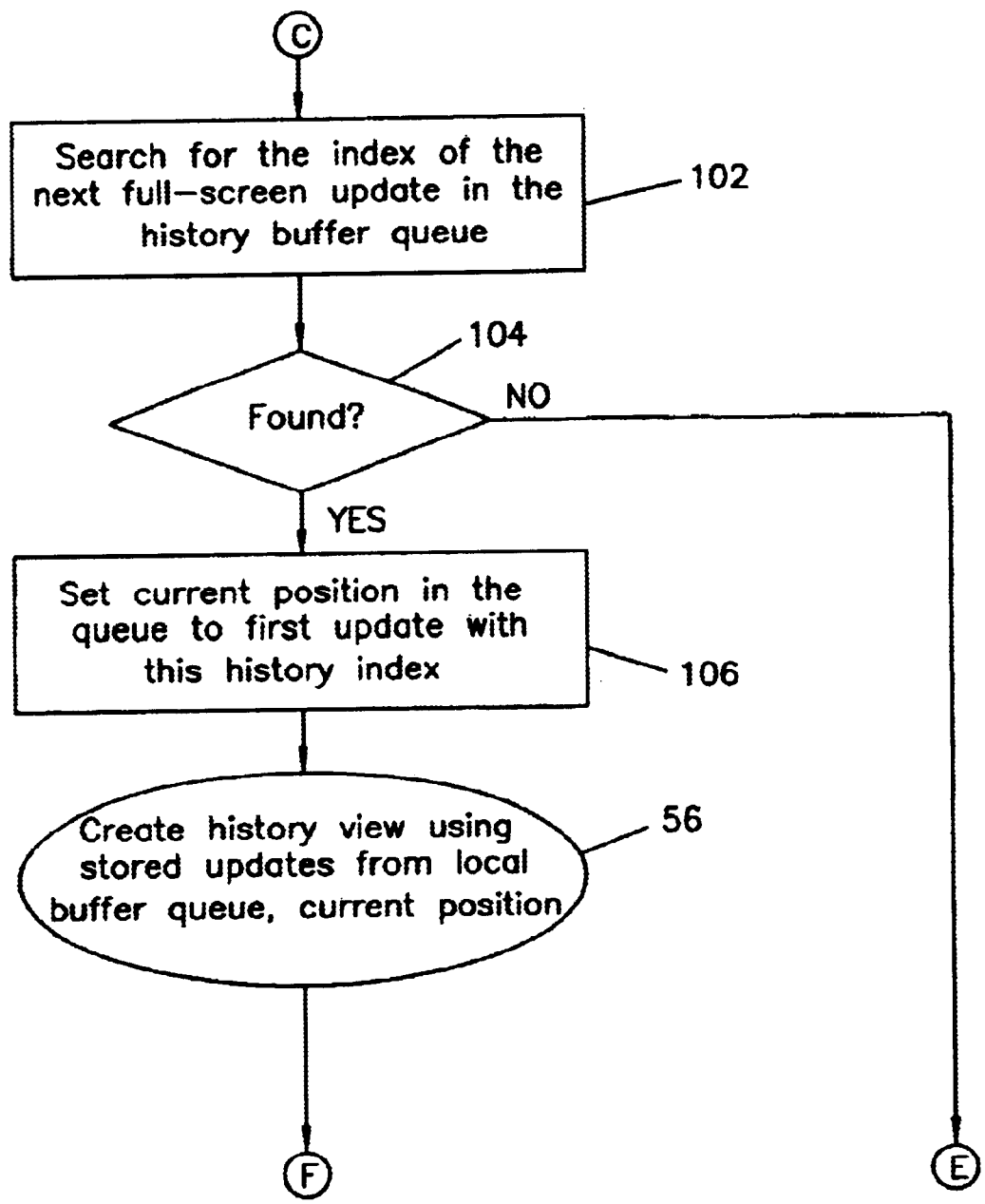

FIG. 6 illustrates the fast forward process in detail. The index is searched for the next full screen update, as shown at 102.

If not found, as at diamond 104, the pointer moves back to the live position. If found, the pointer sets the current position in the queue to the first update, as at 106, and a history view is thereafter created 56.

Figure 7:
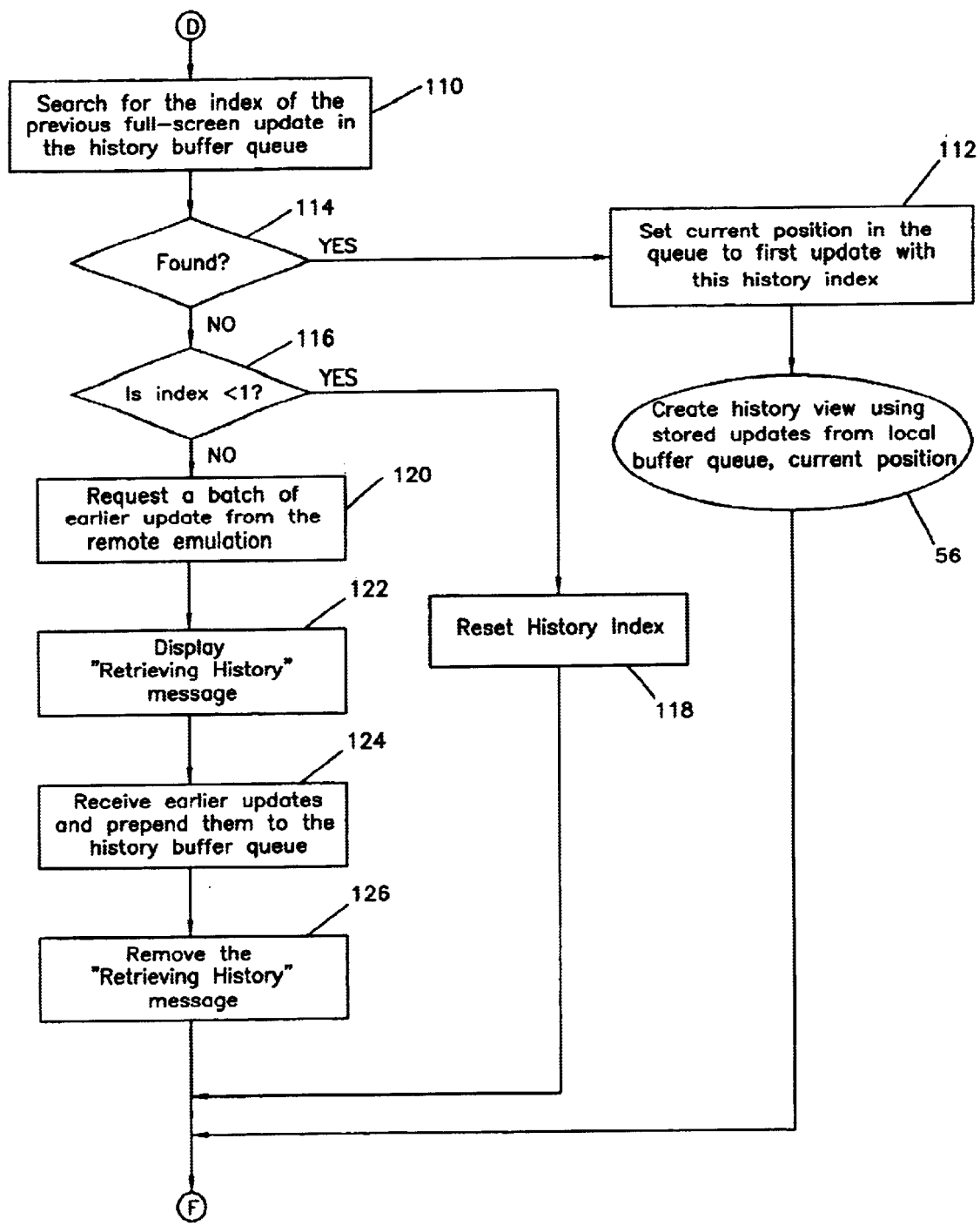

FIG. 7 illustrates in detail the process in the fast backward sequence. The index is searched for the previous full screen update in the history buffer queue as shown at 110.

If found, the current position is set in the queue to the first update, as at 112, and a history view is created 56.

If not found, as shown at diamond 114, a check would be made to see whether the index is less than one as at diamond 116. If so, the history index will be reset as at box 118. The system recirculates as described in FIG. 3.

If the index is not less than one, a batch of earlier updates will be requested as at box 120. The retrieved history message will be displayed, as at 122. Earlier updates will be received and added to the beginning of the history buffer queue. Finally, the "retrieved history" message will be removed, as shown at box 126. The system will then recirculate as shown.

Figure 8:
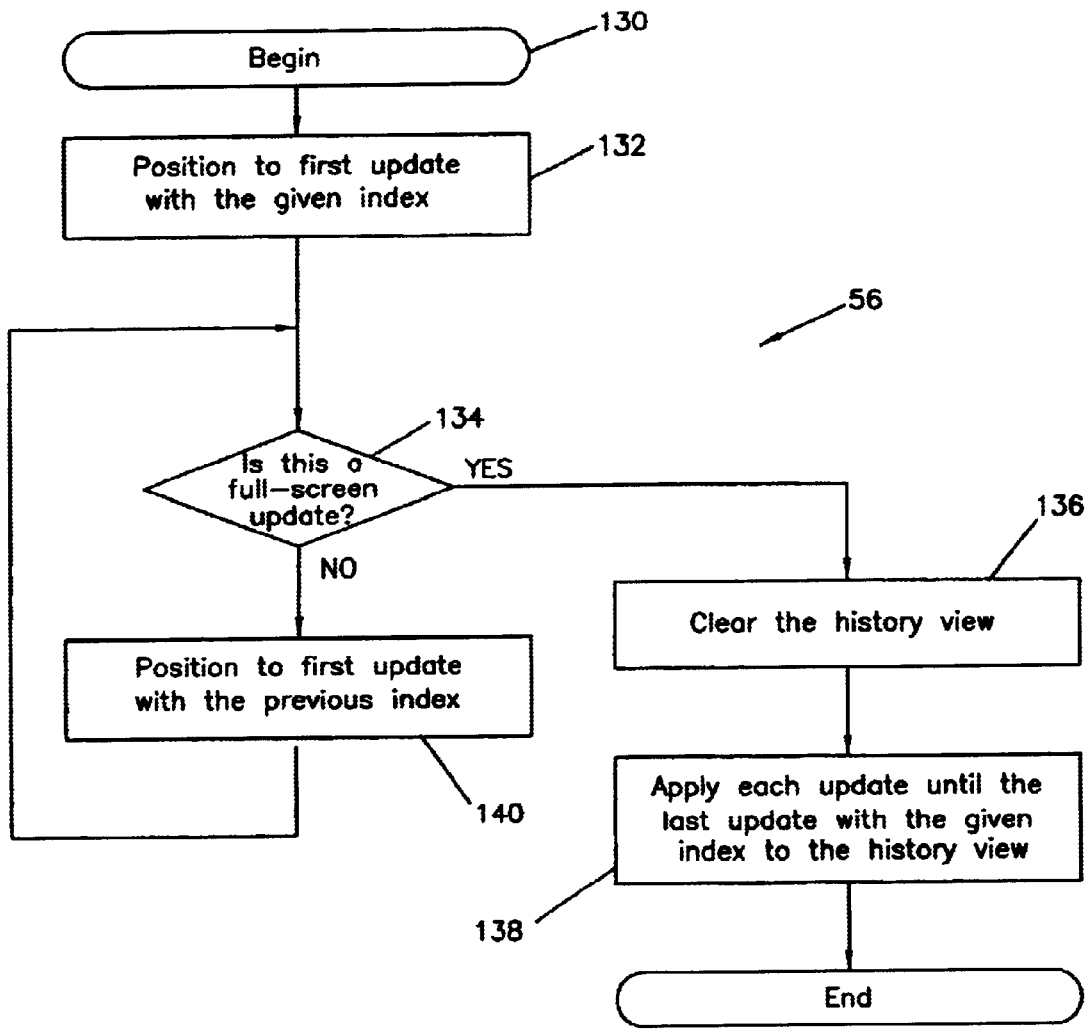

FIG. 8 illustrates the process to create a history view 56 which is utilized in the above sequences. After initiation 130, the pointer is positioned to the first update with a given index, as shown at box 132. It will be determined if this is a full screen update, as shown at diamond 134. If so, the history view will be cleared and each update will be applied until the last update with the given index to the history view, as shown at box 138.

If it is not a full screen update, the pointer will be positioned to the first update with the previous index as shown at 140. This will be repeated as often as necessary to move to a full screen update.

Figure 9:
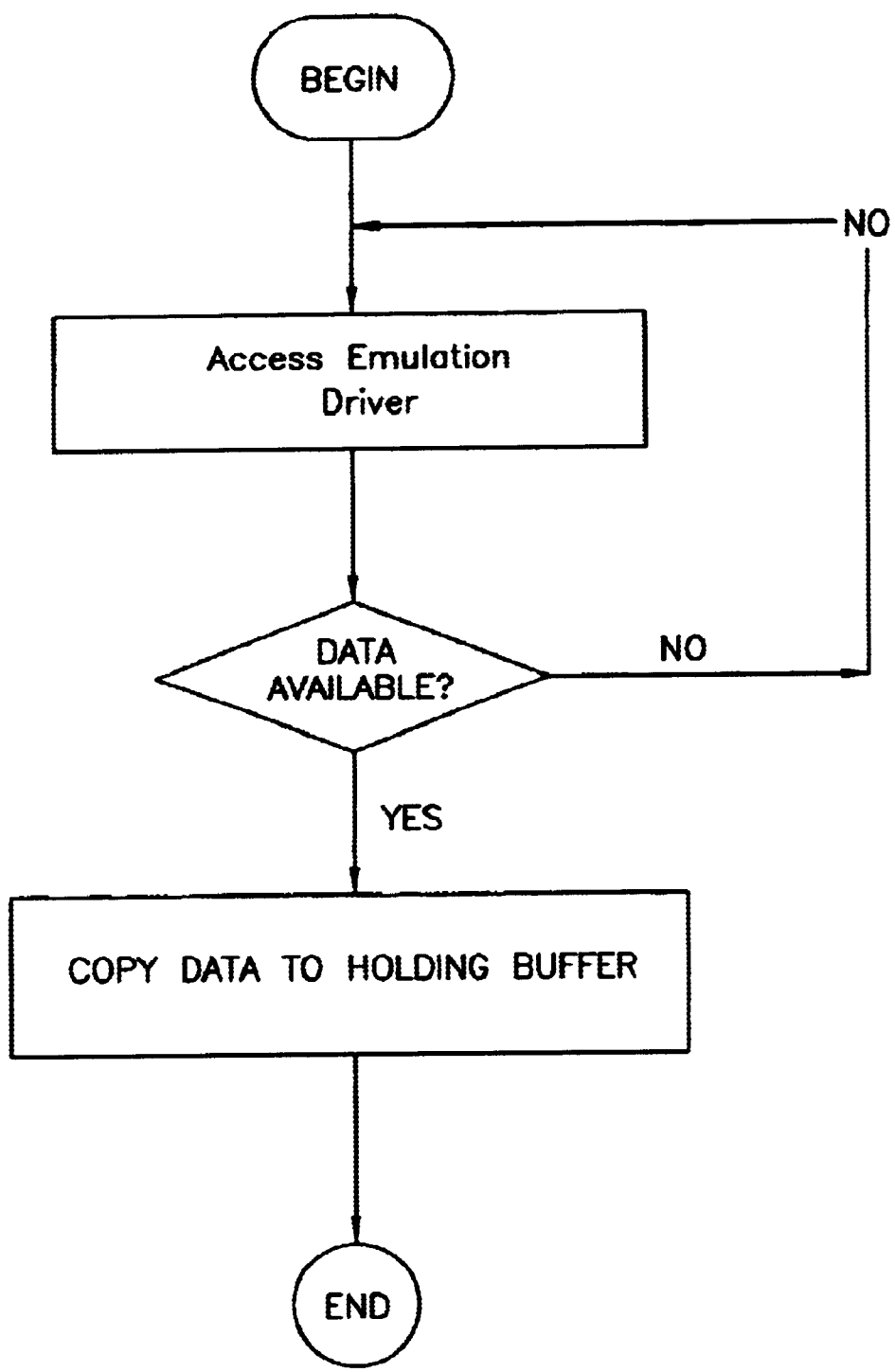
FIG. 9 is a flowchart illustrating programmed logic flow relating to an instruction set for receiving system performance information and a plurality of updates to such information when transmitted from a monitored system central processing unit.

FIG. 9 is provided herein to disclose programming logic flow relating to an instruction set for receiving system performance information and a plurality of updates to such information when transmitted from a monitored system central processing unit.

Figure 10:
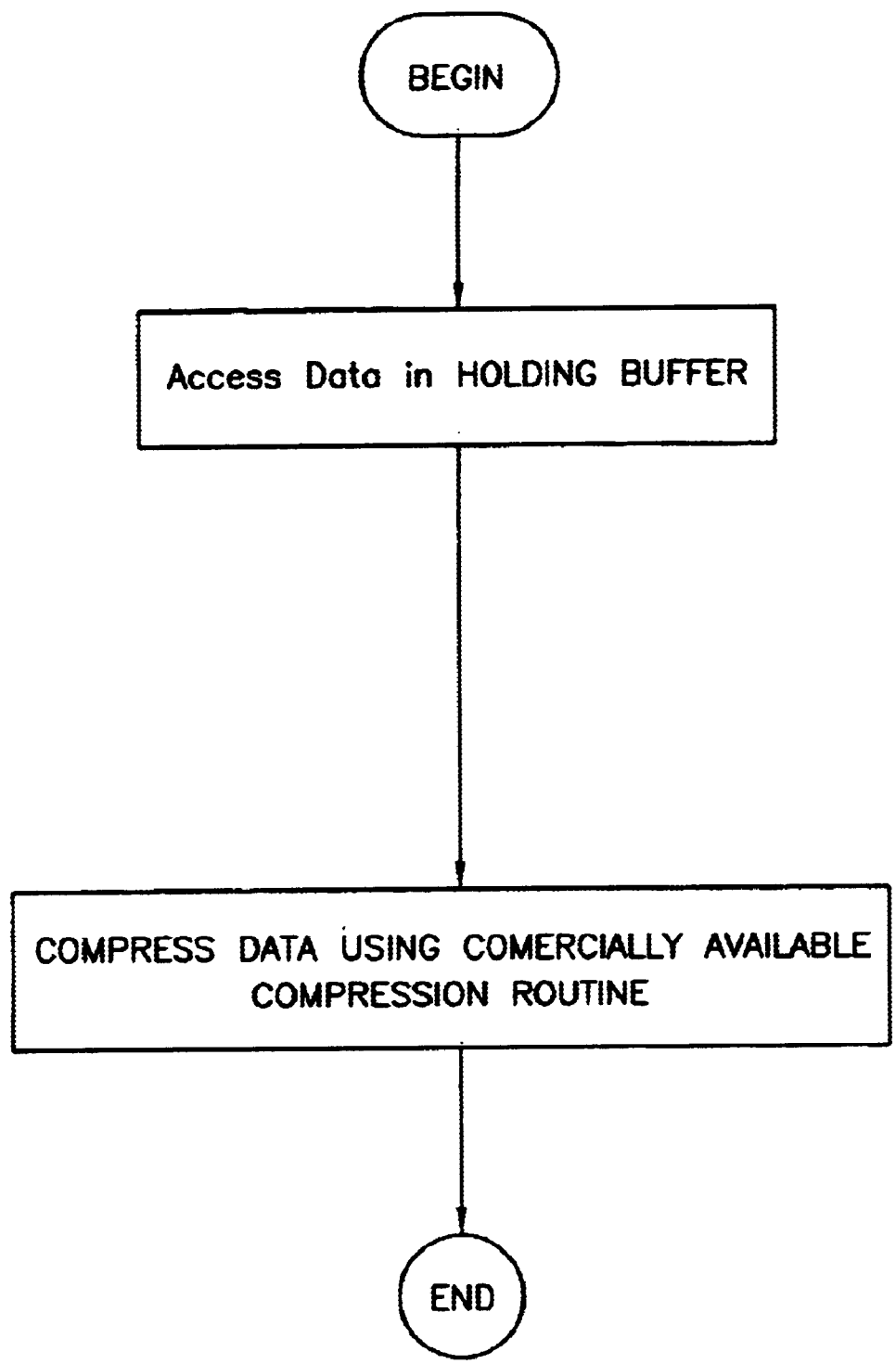
FIG. 10 is a flowchart illustrating programmed logic flow relating to an instruction set for compressing system performance information when transmitted from a monitored system central processing unit.

FIG. 10 is provided herein to disclose programming logic flow relating to an instruction set for compressing system performance information when transmitted from a monitored system central processing unit.

Figure 11:
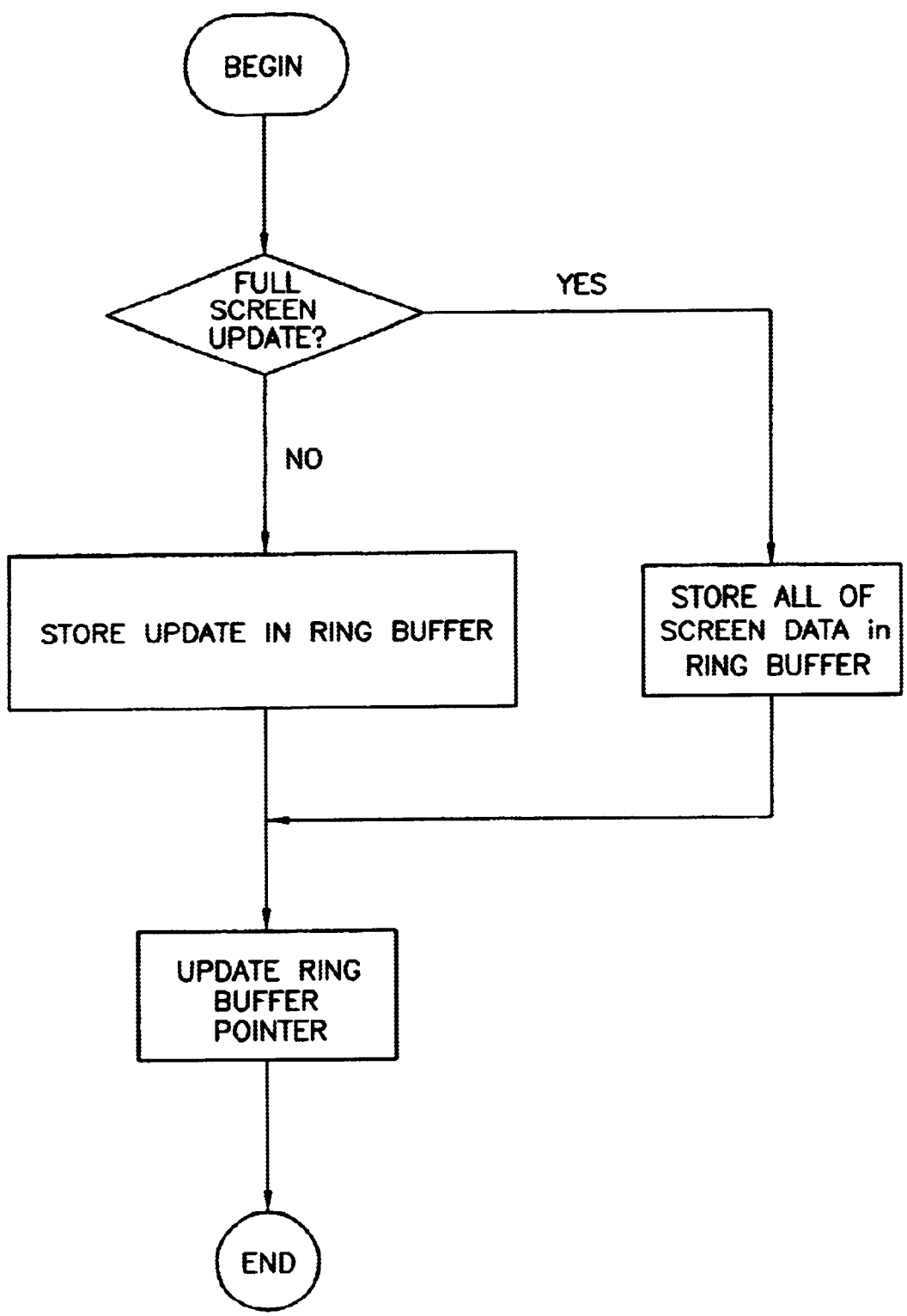
FIG. 11 is a flowchart illustrating programmed logic flow relating to an instruction set for storing system performance information, and updates to such information, to a computer readable memory accessible to a master monitoring system central processing unit.

FIG. 11 is provided herein to disclose programming logic flow relating to an instruction set for storing system performance information, and updates to such information, to a computer readable memory accessible to a master monitoring system central processing unit.

Figure 12:
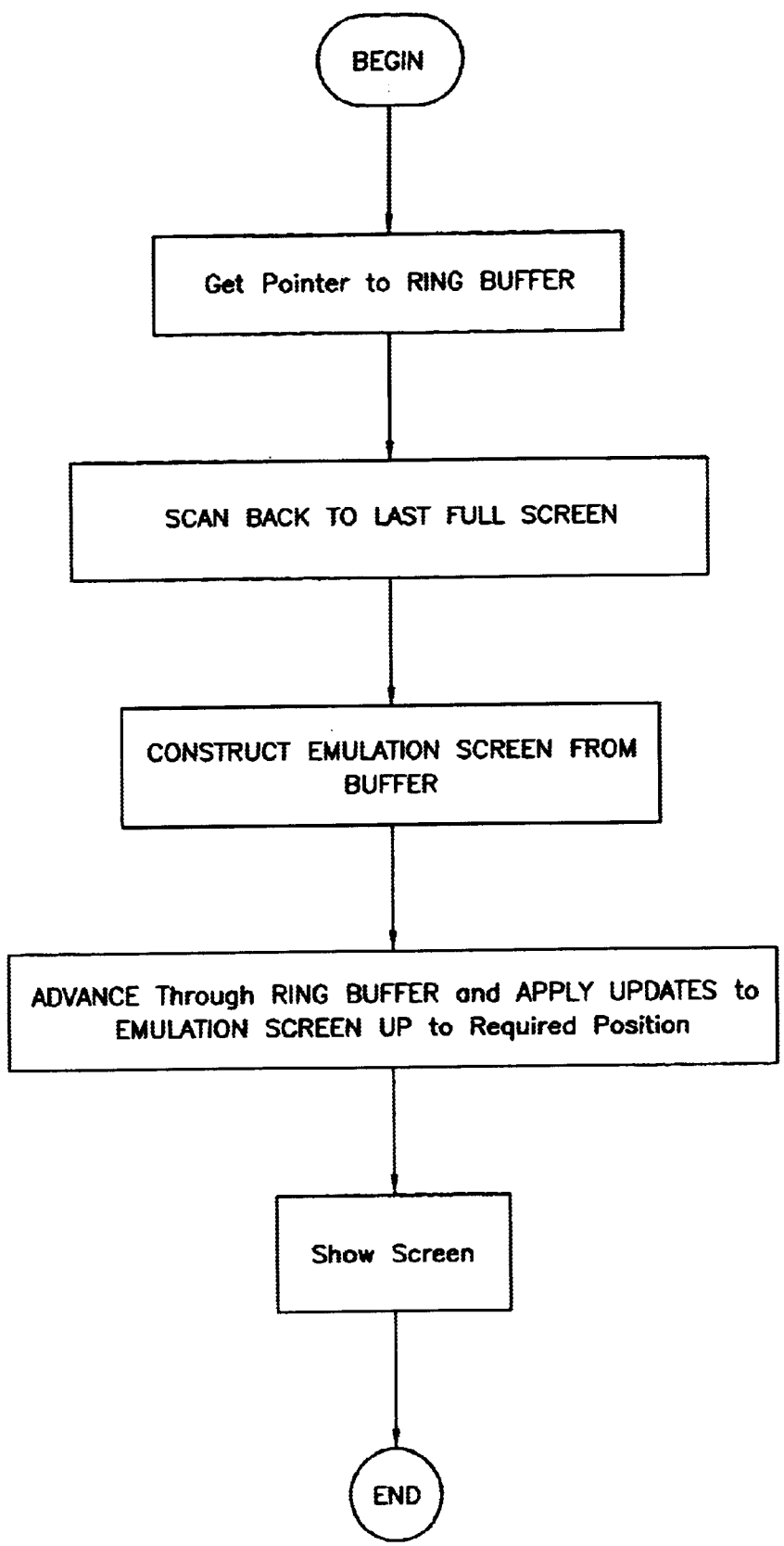
FIG. 12 is a flowchart illustrating programmed logic flow relating to an instruction set for retrieving, decompressing and presenting stored system performance and updates information to a computer output device.

FIG. 12 is provided herein to disclose programming logic flow relating to an instruction set for retrieving, decompressing and presenting said stored information to a computer output device.

Figure 13:
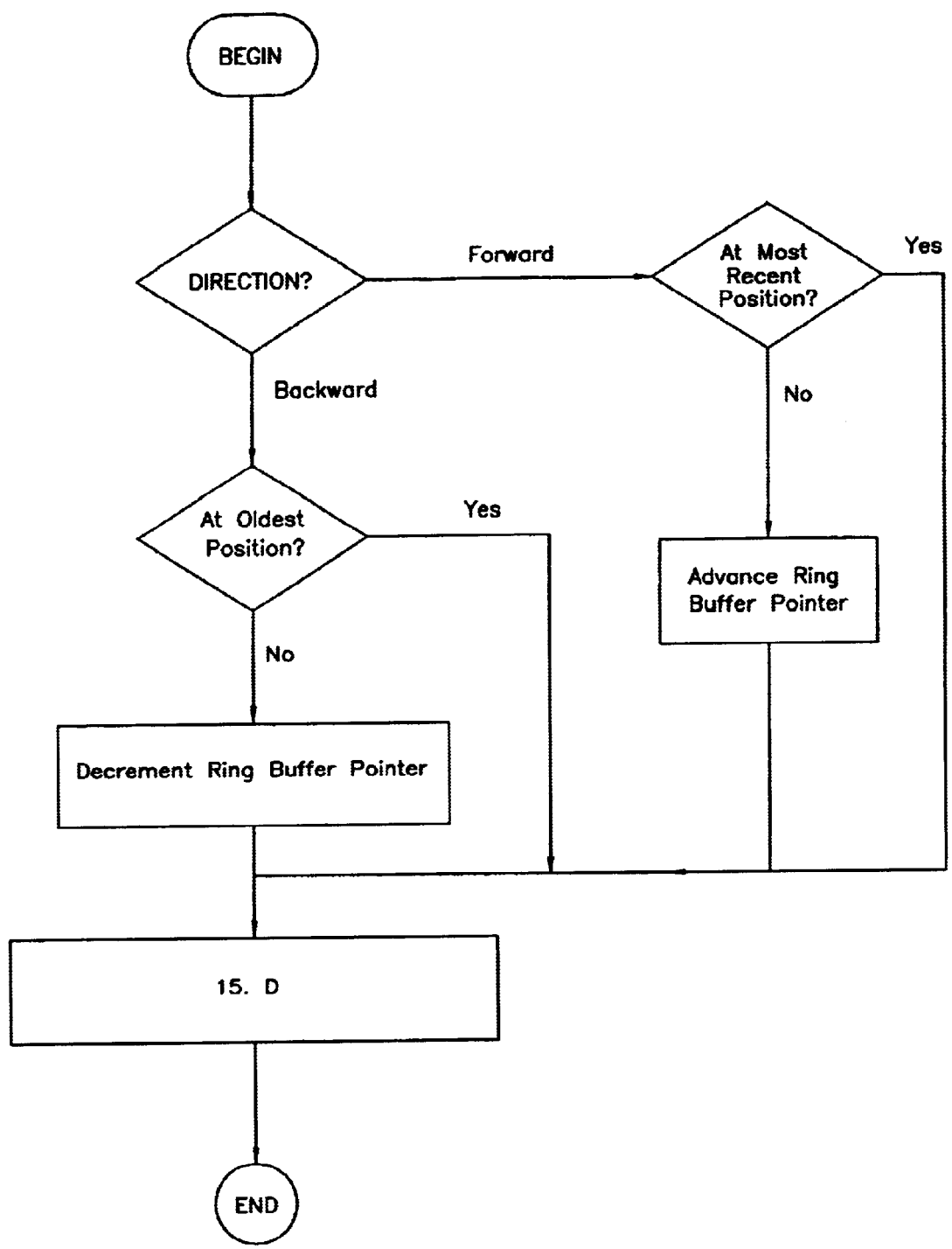
FIG. 13 is a flowchart illustrating programmed logic flow relating to an instruction set to facilitate the forward and backward viewing of historical system performance information.

FIG. 13 is provided herein to disclose programming logic flow relating to an instruction set to facilitate the forward and backward viewing of historical system performance information.

Figure 14:
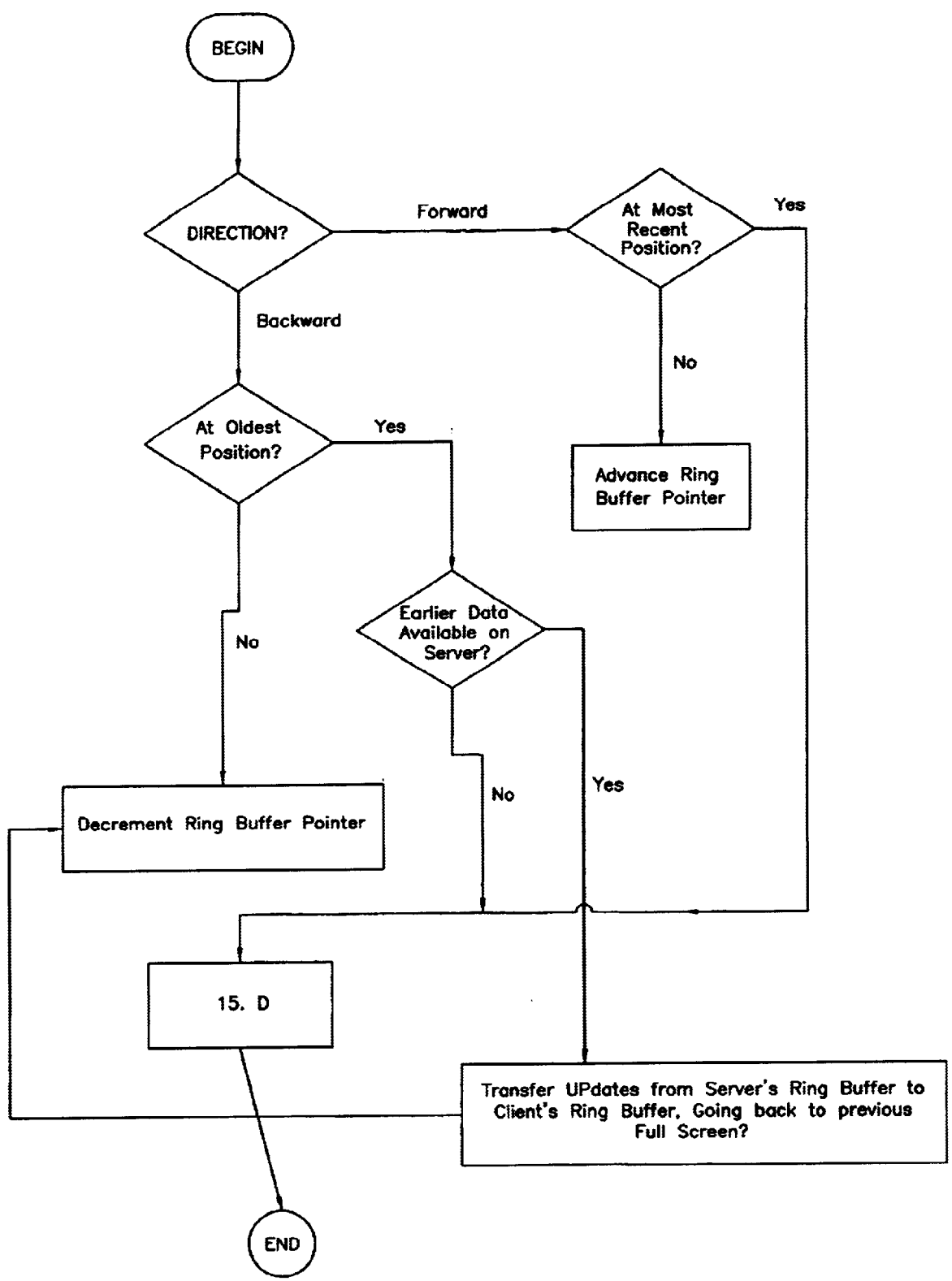
FIG. 14 is a flowchart illustrating programmed logic flow relating to an instruction set to facilitate remote user monitoring.

FIG. 14 is provided herein to disclose programming logic flow relating to an instruction set to facilitate remote user monitoring.

Figure 15:
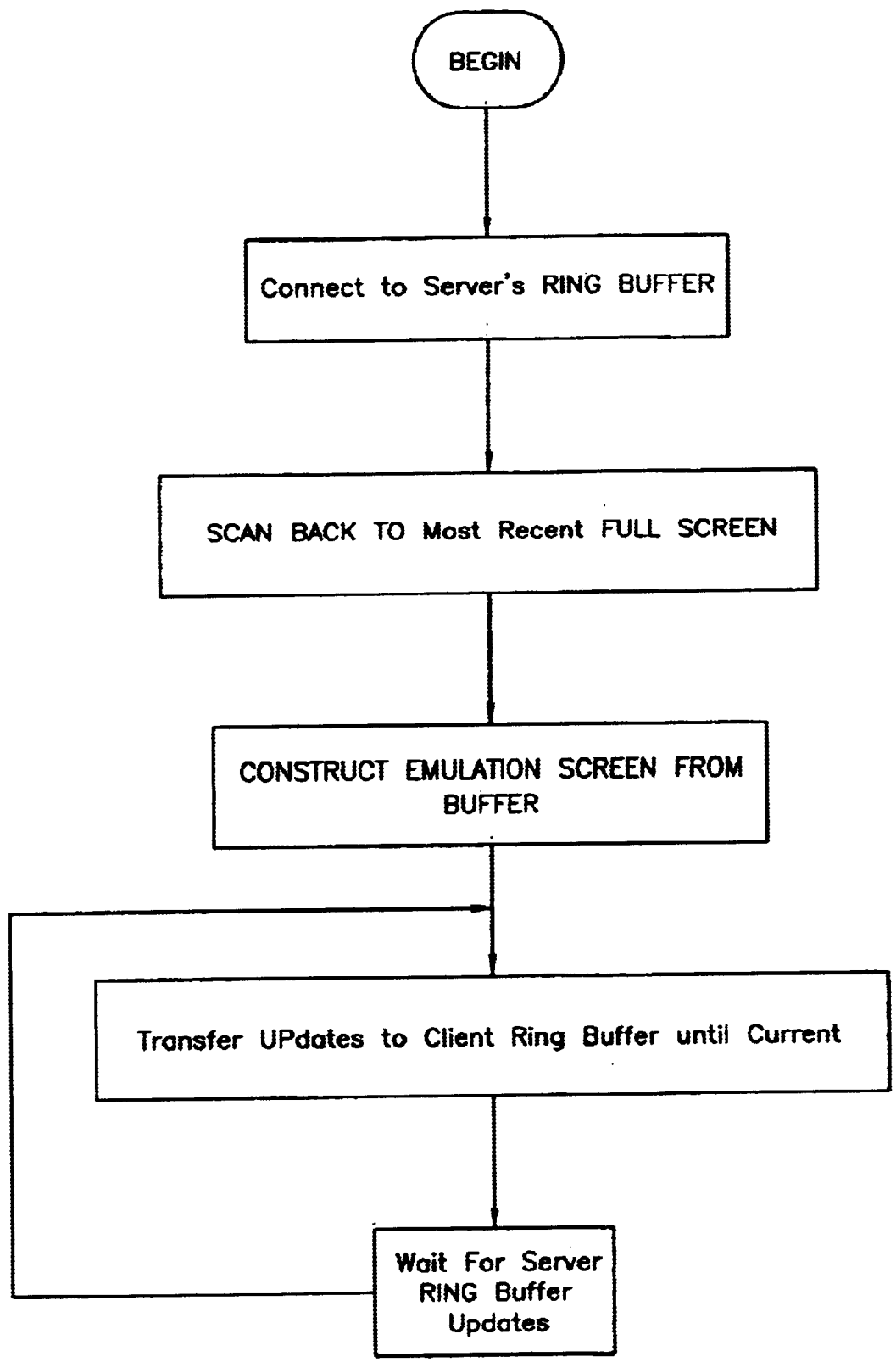
FIG. 15 is a flowchart illustrating programmed logic flow relating to remote user monitoring including the forward and backward viewing of historical system performance information.

FIG. 15 is provided herein to disclose programming logic flow relating to remote user monitoring including the forward and backward viewing of historical system performance information.

Also attached for purpose of facilitating a full and enabling disclosure is a complete source code listing of the subject invention program methodology as Appendix 1, included herein and incorporated by reference.

While the foregoing detailed description has described several embodiments of the encoding and decoding methods of the present invention, it is to be understood that the above description is illustrated only and not limiting of the disclosed invention.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein, the more specific meaning is meant.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

Whereas, the present invention has been described in relation to the drawings attached hereto it should be understood that other and further modifications, apart from those shout or suggested herein, may be made within the spirit and scope of this invention.

What is claimed is:

1. An improved real-time system for observing and evaluating a monitored host system's current and past system hardware screens, operating system screens and application screens destined for a human operator which facilitates the scrollable observation of past and current messages comprising:

a master monitoring system central processing unit;

a monitored host system central processing unit communicably attached to said master monitoring system via a cable, wherein said monitored system generates a plurality of system hardware screens pertaining to control and configuration of hardware, operating system screens, and application screens;

a data communications card in communication with said cable and said master monitoring system central processing unit;

a visual display computer output device communicably attached to said master monitoring system central processing unit;

a computer input device communicably attached to said master monitoring system central processing unit;

a memory within said master monitoring system central processing unit to store each said system hardware screen operating system screen and updates to such screens whenever such screens and updates are presented to said master monitoring system central processing unit; and first software executed from a computer readable memory accessible to said master monitoring system central processing unit, said first software accesses said screens and said updates in reverse order from transmitted order.

2. The improved real-time system for observing and evaluating a monitored system's current and past performance information of claim 1 further comprising:

a remote user monitoring subsystem central processing unit communicably attached to said master monitoring system central processing unit;

second diagnostic software executed from a computer readable memory accessible to said remote user monitoring subsystem central processing unit;

a visual display computer output device communicably attached to said user monitoring subsystem central processing unit;

a computer input device communicably attached to said user monitoring subsystem central processing unit.

3. The improved real-time system for observing and evaluating a monitored system's current and past performance information of claim 1 wherein said monitored system central processing unit is an IBM or IBM compatible mainframe and wherein said cable is a coax cable.

4. The improved real-time system for observing and evaluating a monitored system's current and past performance information of claim 1 wherein said monitored system central processing unit is an AS/400 mini computer and wherein said cable is a twinax cable.

5. A method for observing and evaluating a monitored system's current and past system hardware screens, operating system screens, and application screens destined for a human operator comprising:

receiving a monitored host system's system hardware screens pertaining to control and configuration of hardware, operating system screens, and application screens and updates to such screens transmitted from said monitored system to a master monitoring system central processing unit;

initially compressing said monitored system screens and storing said screens in a computer readable memory accessible to said master monitoring system central processing unit;

storing a plurality of screen updates in said memory;

repeating in sequence the steps above of receiving monitored system screens, initially compressing said screens, and storing said screens and updates to said screens in said memory; and displaying said screens and updates to said screens in reverse chronological order from most recent to earliest.

6. A process for observing and evaluating a monitored system's current and past performance information as set forth in claim 5 including the additional step of accessing said system screens and updates from a remote user master monitoring subsystem.

7. A method as set forth in claim 5 including the additional step of choosing a view of said display of said screens and said updates based on chronological selection and thereafter displaying said screens and updates in a chosen chronological order.

8. A method for reviewing, observing and evaluating a monitored host system's system and console messages comprising:

receiving a plurality of system hardware screens, operating screens, and application screens transmitted from a monitored host system's central processing unit at a master monitoring system central processing unit in communication with said monitored system central processing unit host;

storing said received screens within a computer readable memory accessible to said master monitoring system central processing unit;

receiving a plurality of updates to said system screens; and browsing and searching said screens and said updates remotely via connection of a remote user master monitoring subsystem, wherein said screens and updates are accessed in reverse order from transmitted order.

* * * * *